United States Patent [19]

Williams

[11] 3,881,956
[45] May 6, 1975

[54] FUEL CELL CONSTRUCTION

[75] Inventor: Thomas S. Williams, Newton, Mass.

[73] Assignee: General Engineering Laboratories, Inc., Westford, Mass.

[22] Filed: July 28, 1972

[21] Appl. No.: 276,149

[52] U.S. Cl. .............................. 136/86 R; 136/159
[51] Int. Cl. ......................................... H01m 27/00
[58] Field of Search ........ 136/86 R, 86 A, 159, 160, 136/163

[56] References Cited
UNITED STATES PATENTS

| 913,936 | 3/1909 | Basset................................. 136/160 |
| 3,255,048 | 6/1966 | Comanor et al. .............. 136/100 M |
| 3,496,025 | 2/1970 | Hidebazu ...................... 136/100 M |
| 3,575,719 | 4/1971 | Nelson et al..................... 136/86 R |
| 3,666,561 | 5/1972 | Chiku............................... 136/86 R |

Primary Examiner—Winston A. Douglas
Assistant Examiner—H. A. Feeley
Attorney, Agent, or Firm—Jerry Cohen

[57] ABSTRACT

A stacked array of unit cells, fed and/or drained by a conductive liquid, is subdivided into cell groups which are further subdivided into blocks, which in turn have subblock subdivisions. The blocks have integral elongated passages for carrying liquid, consistent with limiting intercell $I^2 R$ losses through the liquid distribution lines to tolerable levels. The blocks also have a flexible modular construction of components thereof which accommodates model variations and also enhances uniformity of said liquid flow in all such variations.

17 Claims, 9 Drawing Figures

FUEL CELL CONSTRUCTION

BACKGROUND OF THE INVENTION

Fuel cells and other electrochemical or electrolytic devices having at least one electrically conductive liquid (electrolyte) fed to and/or withdrawn from a stacked array of cells are the subject of the present invention. In its more specific aspects, the invention is concerned with — and applied with distinct advantage to — a fuel cell generating over 50 volts from one or more stacked arrays of unit cells, generating 1–2 volts each, the cells being in electrical series within the array(s) and having one or two electrolyte liquids fed to and withdrawn from the cells in fluid parallel.

Each of the four main liquid feed/return lines is subdivided into $N_3$ blocks, each of which has $N_2$ sub-blocks. Each sub-block has $N_1$ cells in its stack.

For instance, a 120 volt 1800 watt two-fluid fuel cell constructed of one-volt cells would require 120 unit cells and 480 separate pieces of tubing (120 anolyte feed, 120 anolyte withdraw, 120 catholyte feed, 120 catholyte withdraw) if constructed as a single stack of repeating units. The present invention calls for dividing the connections into three stages which can be accomplished with only 16 pieces of tubing connecting the array of cells to the liquid sources and sinks. The remaining 464 interconnections can be molded into spacer plates within the sub-blocks.

However, such devices are vulnerable to the problem of losses in electrical power generated due to intercell currents through the parallel fluid feed branches. Elongation and/or cross-section area narrowing of such branch paths, apparent solutions to limit such power losses, conflict with the design optima for ease of manufacture, economy and compactness and fluid feed pumping losses.

It is also a problem of devices of the class described that a drawback to reliable operation at design levels of performance is caused by uneven liquid electrolyte coverage of electrode surfaces.

It is therefore an important object of the invention to provide an economical, easily manufactured and compact construction for devices of the class described.

It is a further object of the invention to limit intercell losses consistent with the foregoing object.

It is a further object of the invention to provide a standard building block for devices of the class described, accommodating variations of design, size and character consistent with one or more of the foregoing objects.

It is a further object of the invention to provide improved fluid flow characteristics to the unit cells of such devices consistent with one or more of the foregoing objects.

SUMMARY OF THE INVENTION

The power loss (in watts) of a multi-cell stack can be expressed $$(1.0) \quad P_L = \frac{V_c^2}{R_A} \theta$$

where
$V_C$ = voltage of one cell.
$R_A$ = Electrical Resistance of one leg of the electrolyte supply tube in ohms.
$\theta$ = a function of the number of stages in series, electrically described below.
$P_L$ = Power lost, (watts)

This power loss is due to the resistivity of the electrolyte itself. From the definition of resistivity $$-R_A = \rho \frac{L}{A}, \text{ where}$$

$\rho$ = electrolyte resistivity (ohm-in)
L = length of one leg or the electrolyte supply tube, (in)
A = Cross sectional area of one leg of the chemical supply tube (in$^2$)

The assumptions made in arriving at this resultant equation are:

1. The electrolyte is supplied from a single source and then delivered in parallel to each stage of the multi-stage device.
2. It is assumed that between the ends of successive electrolyte supply tubes there exists an electrical potential equal to the cell voltage.
3. It is assumed that the resistances of all legs are equal. This is not unreasonable since each cell must be supplied with the same amount of electrolyte from the source. For this to be effective, fluid circuit resistances must be equalized among the various parallel paths. This is most easily accomplished by equal lengths of the same diameter tubing.
4. It is assumed that all cell voltages are equal.
5. The derivation is carried out for one of the four electrolyte paths to each unit cell (having an anolyte feed, anolyte return, catholyte feed, catholyte return — as in a liquid-liquid fuel cell). In Practice, each of the four paths would be evaluated separately and the losses summed. This would be necessary since the resistivity and the length of each of the four paths would not necessarily be identical.

Figure 1:
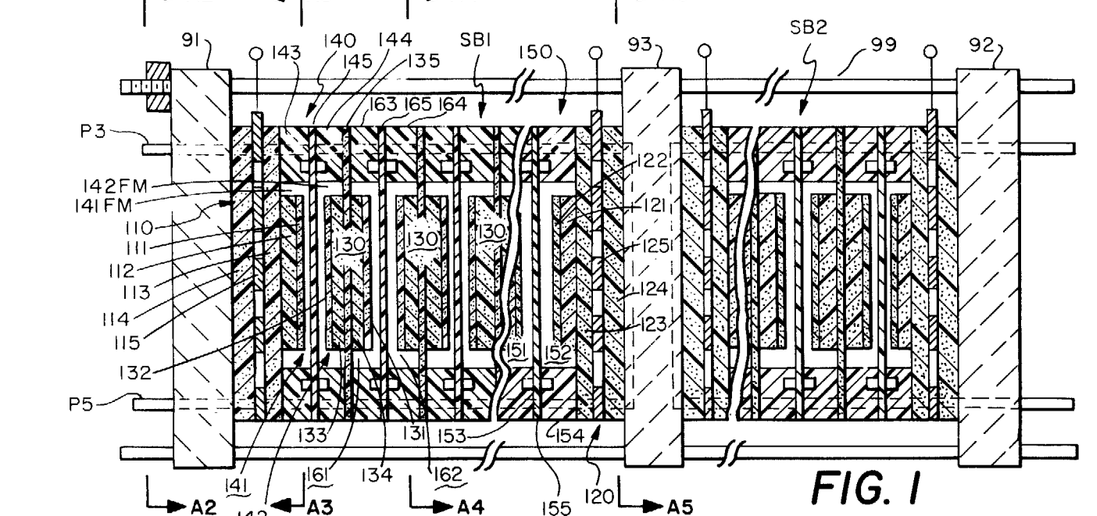
FIG. 1 is a longitudinal sectioned view through a fuel cell block comprising two sub-blocks divided by a plate.
Figure 1A:
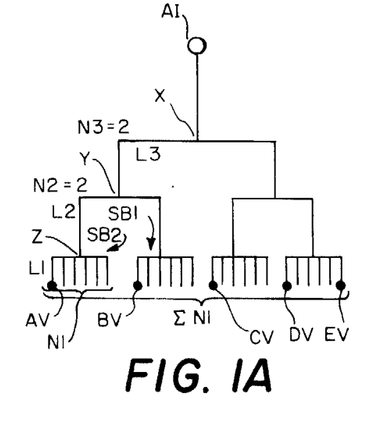
FIG. 1A is a fluid circuit diagram showing the parallel fluid flow system of which the block of FIG. 1 is a part.
Figures 1B, 1C:
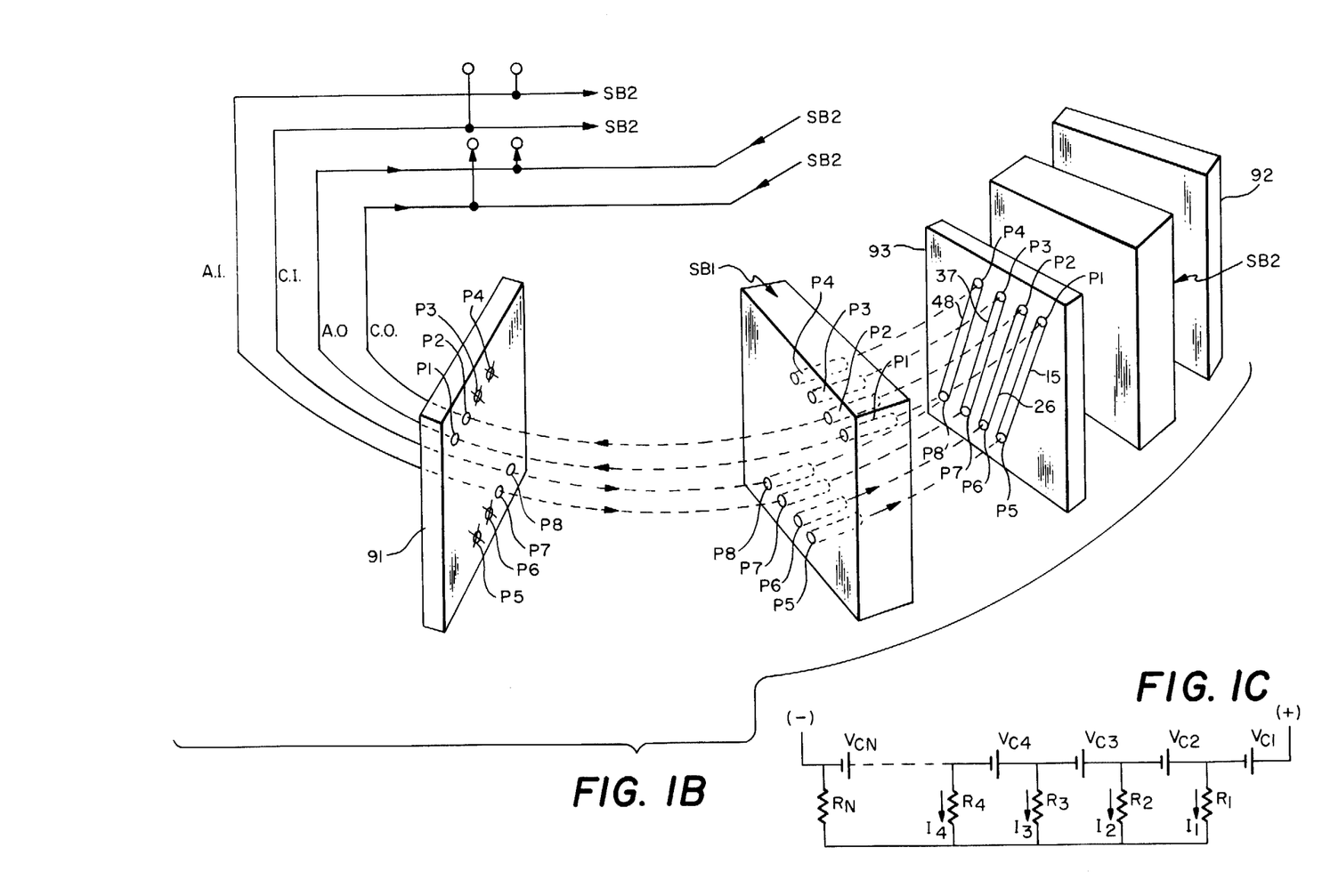
FIG. 1B is an exploded, diagrammatic view of the block of FIG. 1 showing the fluid flow paths.
FIG. 1C is an electrical circuit diagram for a stack of cells in series shown as batteries with intercell electrolyte paths as parallel shorting resistances.
Figure 2:
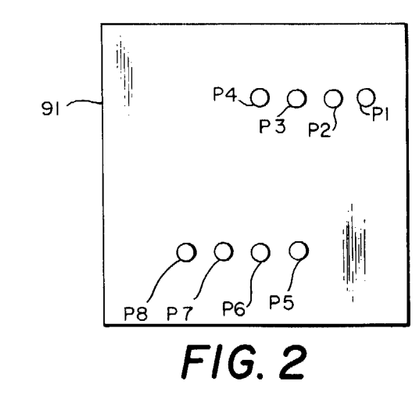
FIGS. 2–5 are transverse sections through FIG. 1 as indicated by arrows A2—A2, A3—A3, A4—A4, A5—A5, respectively.

Using these assumptions and assuming also that the parallel flow situation may be represented by an equivalent electrical circuit wherein each cell (or cell half) has a voltage Vc1, Vc2, etc. and the branch flow paths are treated as resistances R1, R2, etc., carrying currents I1, I2, etc. (resistance path R1 feeding, or draining, the cell which generates Vc1, R2 feeding or draining Vc2, etc.) the foregoing power loss expression is derived as follows. The following expressions can be written:

$(1.1) \quad V_{c1} = I_1 R_1 - I_2 R_2$ [See FIG. 1C for electrical circuit portion]

$(1.2) \quad I_2 = I_1 - \frac{V_c}{R}$ $(1.3) \quad (R_1 = R_2 = R_3 = \text{-----} R_N = R)$ $(1.4) \quad V_{c2} + V_{c3} = I_1 R_1 - I_3 R_3$ $(1.5) \quad I_3 = I_1 - \frac{2V_c}{R}$ $(1.6) \quad (V_{c1} = V_{c2} = V_{c3} = \text{---} V_{cN} = V_c)$ $(1.7) \quad I_n = I_1 - \frac{(N-1)V_c}{R}$ where $n$ identifies some intermediate stage in the fuel cell $(1.8) \quad \sum_{n=1}^{N} I_n = 0 = I_1 + I_2 + I_3 + \text{---} I_n = 0.$ $(1.8.1) \quad = I_1 + I_1 - \frac{V_c}{R} + I_1 - \frac{2V_c}{R} \text{---} + I_1 - \frac{(n-1)V_c}{R}$ $+ \text{---} + I_1 - \frac{(N-1)V_c}{R}$ (where N identifies the number of the last cell in a series, 20th of 20, 30th of 30, etc.)

(1.8.2) $NI_1 - \dfrac{V_c}{R} \sum_{n=1}^{N-1} a_n = 0$  $n = 1, 2, 3, \text{---} (N-1).$ (1.8.3) $I_1 = \dfrac{V_c}{RN} \sum_{n=1}^{N-1} a_n$ (1.8.4) $I_2 = I_1 - \dfrac{V_c}{R} = \dfrac{V_c}{R} \left[ \dfrac{1}{N} \sum_{n=1}^{N-1} a_n - 1 \right]$ (1.8.5) $I_n = \dfrac{V_c}{R} \left[ \dfrac{1}{N} \sum_{n=1}^{N-1} a_n - (n-1) \right] = \dfrac{V_c}{R} [\Phi]$ The wattage loss due to these currents (1.9) $P_L = \Sigma I_n^2 R = \sum_{n=1}^{N} \dfrac{V_c^2}{R^2} \Phi^2 R = \dfrac{V_c^2}{R} \sum_{n=1}^{N} \psi^2$ $P_L = \dfrac{V_c^2}{R} \theta$ A numerical evaluation was carried out as follows:

1. A table of the values of $\Phi$ as a function of $n$ and $N$ was constructed. It was found that first order difference in each direction on the tubes were constant.
2. The entries in this table for each value of $N$ were squared and summed to derive $\theta$ through numerical analysis. A function for $\theta$ was then established. $\theta$ rises as an exponential function of $N$ (1.9.1) $\theta = 0.08235 N^3 + 0.027107 N^2 - .26479 N + 0.155 - 33$ and it is seen from equation (1.0) above that power loss will therefore rise as an exponential function of $N$.

Reviewing this derivation, it was sensed that simply increasing the number of cells in a stack to reach a desired aggregate performance (e.g. stacking 60 2-volt fuel cells to reach 120 volts) should be avoided. Instead, it is proposed to break cell stack blocks down into sub-blocks, with the sub-block groups being in turn sub-groups of a larger aggregation, if necessary, in assembling enough unit cells for a desired aggregate performance.

Thus, one can operate on the knee of the exponential loss-related curve in establishing systems with tolerable power losses and the need to reduce power losses through other means—longer branch tubes, narrower tubes, higher electrolyte resistivities, etc.—is thereby attenuated.

This loss reduction, together with the reentrant and divider plate features described below, makes possible the use of internal passages within each sub-block to serve as liquid feed and return lines within each sub-block.

The validity of this approach is most readily explained through use of an example.

The short circuit power losses within a single sub-block of $N_1$ unit cells can be expressed in accordance with the above derived equation 1.0 as:

(2.0) $W_1 = \dfrac{V_c^2 A_1}{R_o L_1} [\Phi_{N_1}]$ [See FIG. 1A for fluid circuit portion]

$V_c$ = Unit cell voltage
$V$ = Fuel cell terminal voltage
$R_o$ = Electrolyte resistivity - ohm inches
$A$ = Passage cross sectional area, in$^2$
$L$ = Passage length, inches for the various distribution lines —L1: within a sub-block, L2: block to sub-block, L3: main to block. The function $\theta$ as derived above (eq. 1.9.1) is evaluated for $N_1$ cells. The losses within all of the sub-blocks in the fuel cells can then be expressed as:

(2.1) $\Sigma W_1 = \dfrac{N_2 N_3 A_1}{R_o L_1} [\theta_{N_1}]$

The additional power loss in one block of $N_2$ sub-blocks (where $A_2$ and $L_2$ are the sub-block interconnecting passage dimensions) can be expressed:

(2.2) $W_2 = \dfrac{(N_1 V_c)^2 A_2}{R_o L_2} [\theta_{N_2}]$

Where $\theta$ is evaluated for $N_2$ cells, the losses for the $N_3$ blocks in a fuel cell can then be expressed:

(2.3) $\Sigma W_2 = \dfrac{N_3 (N_1 V_c)^2 A_2}{R_o L_2} [\theta_{N_2}]$

The power loss due to assembly of $N_3$ blocks into a fuel cell can be expressed:

(2.4) $W_3 = \dfrac{(N_1 N_2 V_c)^2 A_3}{R_o L_3} [\theta_{N_3}]$

Where the function $\theta$ is evaluated for $N_3$ cells. The total short circuit loss (for one set of interconnections) can then be expressed as the sum of equations 2.1, 2.3, and 2.4 as follows:

(2.5) $\Sigma W = \Sigma W_1 + \Sigma W_2 + W_3$

Before detailing this expression, there are some interdependencies which can be expressed. To minimize fluid pumping losses, it is helpful if fluid velocities remain constant insofar as possible through the various passages involved:

(2.5.1) $A_2 = N_1 A_1$
(2.5.2) $A_3 = N_1 N_2 A_1$ also:
(2.5.3) $V = N_1 N_2 N_3 V_c$ Equation (2.5) can now be written out substituting equation 2.4.1 and 2.5.2 and simplifying:

$$(2.5.4) \quad \text{Watts loss} = \frac{V_c^2 A_1}{R_o} \left[ N_2 N_3 \Theta_{N_1} + \frac{N_3 N_1^3}{L_2} \Theta_{N_2} + \frac{N_1^3 N_2^3 \Theta_{N_3}}{L_3} \right]$$

For illustrative purposes this general relation can be applied to a specific design. Suppose that:
$V_c = 1.0$ volts; $A_1 = 0.004$ in$^2$; $L_1 = 1.5$ inches;
$L_2 = 10$ inches; $N_2 = 2$; $R_o = 0.5$ ohm in.;
$V = 120$ volts.

For a 60 in$^2$ electrode operating at one ampere/in$^2$, the power generated by the assembled fuel cell is 7.2 K.W. Assuming an allowable short circuit loss of 10 percent, and equal diversion of the loss among the four branches of the fluid supply system, this allowable loss is 180 watts. Equation 2.5.4 is then solved for L, using various combinations of $N_1$ and $N_3$ with the following result.

| $N_1$ | $N_2$ | $N_3$ | $L_3$ | Total Number of Pieces of Tubing Length $L_3$ | Total Tubing Length (in.) |
|---|---|---|---|---|---|
| 10 | 2 | 6 | 29.4 | 24 | 700 |
| 12 | 2 | 5 | 31.6 | 20 | 632 |
| 15 | 2 | 4 | 37.8 | 16 | 605 |
| 20 | 2 | 3 | 68 | 12 | 815 |

It is seen that a minimum tubing length can be achieved with a reasonable number of such tubes.

Accordingly, for a fuel cell whose design requirements are in accord with the above assumptions, 15 unit cells would be assembled into a sub-block; two sub-blocks would be coupled to form a block and four blocks would be connected with tubing to the pump main feed and return manifolds and reservoirs.

From the foregoing analysis a general cell stacking system is established which accommodates internal passage construction at the distribution level N1/L1 and avoids parallel arrays of tubes or other methods of artificial electrolyte resistance increase, such as injection of gas bubbles or pulsed valving arrangements, which have been used in the art at great penalties of cost and/or complexity or pump power to limit intercell power losses. The new cell system provides basic modular cell stacks, as sub-blocks and blocks, fed and drained in a parallel array for each electrolytic fluid used by the cells of the stack.

The cells are formed in blocks and sub-blocks of longitudinally stacked unit cells, the unit cells being of slab-like form and having overlapping marginal portions and one or more transversely central (though not necessarily precisely centered) electrolyte compartments. The compartments have average transverse width and height dimensions which are each at least 3 inches and equal to each other within a range of ratios of from 1:3 to 3:1 and exactly equal for square or circular configurations. The average unit cell longitudinal thickness is no greater than 0.5 inches and typically is about 0.2-inches per cell, affording about 3-inches total thickness for a 15 cell stack. Longitudinal passages are provided in the overlapping marginal portions of the stack some such passages serving as manifolds connected in fluid parallel to the unit cells and some as through conduits. The longitudinal passages can be confined to margins at one or two edges of the cells leaving intervening marginal spaces free for thinner construction, electrical leads, tie bolts and other accessories.

Preferably the longitudinal passages connect to each of the unit cells at edges thereof (tangentially) at multiple spaced points along such edges, via branched tributary passages which are of equal length within the limits of 1:2 to 2:1 and constitute the effective design length L1 for purposes of the above analysis. The cells preferably have integral manifolds therein running along the said edges between said spaced points of intersection with the branched tributaries.

Included in the stack, at one or both ends of sub-block array portions therein are end or divider pressing plates (i.e. transmitting and preferably transversely spreading longitudinal compressive forces to the stack). The plates have transverse channels therein whose lengths are equal to at least the lesser of the average height or width dimension of the cell electrolyte compartments in the stack. In the case of 8-inch by 8-inch compartments the pressing plate transverse passage would run diagonally and straight and have a length of about 10-inches.

The transverse passage connects to the end of the above longitudinal passages and the length of the transverse passage constitutes the effective design length L2 discussed above.

External connections to blocks and sub-blocks of such cells can be made to the ends of said transverse passages, opposite to the ends of the transverse passages which intersect the longitudinal passages which branch to the unit cells.

Additional unbranched longitudinal passages can pass through the overlapping marginal portions of the cell stacks and through intervening end or divider plates, if necessary to provide said external passage to transverse passage connections in long form and span intervening sub-blocks.

Additional higher stages of fluid parallel branching (N2 and N3 above, or more, N4, N5, etc.) can be provided externally of the blocks and sub-blocks.

These and other objects, features and advantages are more particularly elaborated in the following detailed description, taken in connection with the accompanying drawing wherein,

DETAILED DESCRIPTION OF PREFERRED EMBODIMENTS

Referring now to FIG. 1, there is shown a fuel cell sub-block 100 comprising a stacked array of unit liquid—liquid fuel cells, made up of an end anode electrode 110, an end cathode electrode 120 and a plurality of bi-polar mid electrodes 130 forming first and second unit cells, 140 and 150, respectively at the longitudinal ends of the stack, with additional cells formed therebetween by confronting bi-polar electrodes 130 in electrical series and fluid parallel (i.e. parallel electrolyte feed and parallel electrolyte withdrawal for anolyte and catholyte respectively).

An ion transport membrane 145 divides cell 140 into anolyte compartment 141 and catholyte compartment 142. Similarly, a membrane 155 divides cell 150 into anolyte compartment 151 and catholyte compartment 152 and similar membranes 165 are provided for the intermediate cells dividing them into anolyte compartments 161 and catholyte compartments 162.

While only a small number of cells are shown in the stack for purposes of illustration, it will be appreciated that many more cells can be incorporated in such stack on the same principles.

The end anode electrode 110 comprises a surface layer 111 of active charcoal on a condutive substrate 112 which is in turn bonded to a laminated back-up electrode comprising conductive substrates 113, 114 which are sandwiched about an expanded metal screen 115.

Similarly, cathode electrode 120 comprises a charcoal coat 122 on a conductive substrate 121 which is in turn bonded to a laminated back-up electrode which comprises conductive substrates 123, 124 sandwiched about an expanded metal screen 125. Bi-polar mid-electrodes 130 have charcoal faces 131, 132 bonded to conductive substrates 133, 134 which are sandwiched about a central conductive substrate 135.

Figures 3, 4:
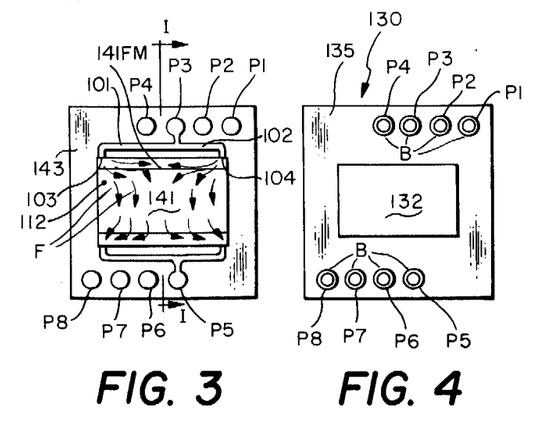

Frame gaskets 143, 144, 153, 154, 163, 164 space the electrodes and membranes and complete the enclosure of slab-like electrolyte compartments 141, 142, 151, 152, serving as walls therefor. The gaskets can also provide conduits for feed and return of electrolyte as shown in FIG. 3 where gasket 143, serving as side wall for compartment 141 carries feed line P3 which branches out in tributary tubes 101, 102 to feed anolyte to upper corners 103, 104 of compartment 141 and return line P5 which receives anolyte withdrawn from the lower corners of compartment 141 via a similar branched tube arrangement.

The conductive substrates 113, 114, 112, 133, 135, 134, 121, 124 comprise hot pressed mixtures of plastic and carbon, the plastic being polyvinylidene fluoride (PVF), polyvinyl chloride, polyethylene or teflon, PVF being preferred and the carbon being a finely divided conductive form such as graphite and in a mixture of about 50 percent graphite-50 percent PVF by weight with variations of the mix to adjust resistivity and thermal coefficient of expansion in particular constructions. The layers 111, 132, 131, 122 are pressed into their respective substrates 112, 133, 134, 121 and the laminates 113, 114, 115 and 123, 124, 125 are separately hot pressed. Then the final assemblies of electrodes 110, 130, 120 are completed by hot pressing.

The membranes 145, 155, 165 are preferably 3 mil thick porous, electrochemical grade polypropylene film.

The parts require machining, to make fluid passages and tie rod holes therein, and application of sealants prior to assembly. Then they are assembled as indicated in FIG. 1 and held in compression by tie rods 99 to form a block-like compact package.

FIGS. 2–5 are end views of components 91, 143, 130 and 93 viewed as shown at A2, A3, A4 and A5, respectively, in FIG. 1. They show the aligned ports P1-P8 running through the marginal portions of those stacked components to form longitudinal fluid flow passages. Exact fluid circuits are described below in connection with FIGS. 1A, 1B and 6.

It is important to assure uniformity of electrolyte flow through the anolyte and catholyte compartments over the electrode surfaces. The cell construction enhances such uniformity of flow, as shown in FIGS. 1, 3 and 4, wherein a feed manifold 141FM is provided in anolyte compartment 141 and a feed manifold 142FM is provided in the catholyte compartment 142FM. The manifolds are formed integrally with the compartment structure. Similar return manifolds are provided for the respective compartments. FIG. 3 indicates flow pattern (Arrows F) for anolyte compartment 141. The feed tube 100 branches into lateral delivery tubes 101, 102 with respective corner exits 103, 104 at ends of manifold 141FM at the upper corners of compartment 141. Typical cross-section dimensions for manifold 141FM are 1/16 inch square and the thickness of the central portion of compartment 141, established by separation of the anode surface 111 from the surface of membrane 145, is typically 1/64 inch. The manifold and lateral manifold flow pattern is thus intrinsically established with minimal extraneous structure for this purpose and consistent with multiple spaced point fluid entry (or drain) at the cell compartment edge which allows a significant design length L1 to be established in a small space within the overlapping margin of component cells of the cell stack.

Spacers (not shown) are set in the anolyte and catholyte compartments to establish a uniform spacing of anode and cathode electrodes from the thin barriers 145, 155. The spacers can have the form of ribs on the electrodes, corrugations or channels in the electrodes, net with raised crossovers between intersecting synthetic fiber threads (e.g. polypropylene) or ribs on the barriers.

The branch tributaries, e.g. 101, 102, are formed as troughs in gaskets 143, 144, 153, 154, 163, 164 and the troughs butt against membranes 135, 145, 155, 165 as shown in FIG. 1. Similarly, transverse channels D15, D26, D37 and D48 are formed as troughs in plate 93 and they butt against substrate 124 to form complete elongated passages. Substrate 124 has a low carbon loading, as indicated below and therefore has a high resistivity. However, if desired an additional insulating film can be provided between substrate 124 and plate 93.

FIG. 3 is an end view of the spacing gasket frame 143. It is made of insulating material, e.g. polyvinyl chloride, and is provided with ports P1-P8 which are punched through during or after frame manufacture. If ports P1-P8 are formed after frame manufacture, only a single molding die is necessary to form the shapes of all frames 143, 144, 163, 164, 123, 124 and the troughs 101, 102 (upper and lower) therein and a single multiple hole punch can form ports P1-P8 for all of overlapping parts 114, 112, 143, 145, 144, 135, 163, 165, 164 . . . 153, 155, 154, 123, 124. The metal screens 115 and 125 would be short enough to be by-passed by ports P1-P8 and, in practice, would extend out of electrodes 110 and 120 in a direction rotated 90° from the direction shown in FIG. 1 for convenience of illustration.

FIG. 3 shows anolyte feed through P3 and drain through P5 and catholyte feed would be in P4 and drain in P6. However, it is useful in some instances to have cross-over, i.e.-anolyte feed at P3, drain at P6 and catholyte feed at P4, drain at P5, in order to balance their flow patterns in the cell compartments by compensating flow resistance in their respective tributary feed and drain passages.

FIG. 4 indicates a plan view of the bi-polar electrode laminate 130. The electrode 132 is so proportioned in size that its side edges can be readily conformed to sides of frame 143 to provent side leakage of electrolyte around the electrode.

FIGS. 1, 3 and 4 shows that the raised electrodes, e.g. cathode 132 in bi-polar laminate 130 have a lesser height than the compartments and are positioned to form the manifolds (e.g. 141FM, 142FM of FIG. 1).

Typical manufacturing conditions which have been used for making cells of the type shown in FIG. 1 are:

(1.1) Mix:
55 percent Dixon grade 1175 graphite
5 percent Dixon grade XC72 graphite which has been pulverized to go through a 40 mesh screen
40 percent PVF copolymer (Kynar grade 3584)
(1.2) Blend (PK blender without agitator bar) 6 minutes
(1.3) Sift to break up clumps
(1.4) Trowel a slab 3/16 thick
(1.5) Preheat at 400°F for 7 minutes
(1.6) Press at 400°F, 256 psi for 7 minutes
(1.7) Cool at 50°F, 256 psi for 7 minutes
(1.8) Release (2.0) for making sheets 114, 124
(2.1) Mix 50 percent 3584 Kynar (PVF copolymer) with 50 percent Dixon Grade 1112 graphite. Sieve PVF copolymer to break up clumps.
(2.2) Blend for 3 minutes in PK blender without agitator bar plus 3 minutes with agitator bar.
(2.3) Sift to break up clumps.
(2.4) Trowel a slab 0.100 in thick
(2.5) Preheat for 7 minutes at 350°F
(2.6) Press for 7 minutes at 400°F at 256 psi
(2.7) Cool for 7 minutes at 50°F at 256 psi.
(2.8) Release (3.0) for making sheets 113, 130, 123
(3.1) Mix 40 percent PVF copolymer Kynar grade 3584 with 60 percent Dixon grade 1112 graphite. Sieve copolymer to break up clumps.
(3.2) Blend as in (2.2)
(3.3) Sift as in (2.3)
(3.4) Trowel a slab as in (2.4)
(3.5) Preheat as in (2.5)
(3.6) Press as in (2.6)
(3.7) Cool as in (2.7)
(3.8) Release (4.0) To coat sheets 112, 133, 134, 121 (Coating=122, 131, 132, 111)
(4.1) Using activated charcoal such as Darco 20/40, spread a coating ⅛ inch thick on the surface of the sheet.
(4.2) Preheat the coating and the sheet to 400°F for 3 minutes.
(4.3) Press at 400°F for 3 minutes at pressure of 200 psi
(4.4) Cool at 50° for 3 minutes at a pressure of 200 psi (5.0) To laminate sheets 114 and 113 with copper conductor 115, sheets 123 and 124 with copper conductor 125.
(5.1) Sprinkle a small amount of a mixture of 60% grade 1112 graphite between the copper screen and the two sheets.
(5.2) Preheat at 400°F for 3 minutes.
(5.3) Press at 200 psi at 400°F for 3 minutes.
(5.4) Cool at 50°F at 200 psi for 3 minutes.

The differing graphite loadings balance coefficients of thermal expansion and produce a flat resultant laminate which is important for later assembly and reliable cell dimensioning.

(6.0) To laminate the coated electrodes 132, 133, 134 to the assemblies made per (5.0) above and to the sheet 134.
(6.1) Preheat the assembled parts to 350°F for 3 minutes
(6.2) Press at 350°F for 3 minutes at 80 psi.

(7.0) The passages P1 to P8 and tributaries which carry conductive electrolyte need to be insulated as they pass through the electrodes 110, 130, and 120. This is accomplished as follows.
(7.1) Mix 95 percent PVF copolymer (Kynar 3584) with 5 percent graphite (Dixon grade 1112).
(7.2) Trowel a slab 3/16 thick
(7.3) Preheat to 400°F for 7 minutes
(7.4) Press at 400°F for 7 minutes at 135 psi.
(7.6) Cool at 50°F for 7 minutes at 135 psi.
(7.6) Cut into plugs B 1/64 smaller in diameter than the holes in the electrodes themselves.
(7.7) Insert plugs B (FIG. 4) into the holes in the electrode sheet.
(7.8) Preheat electrode sheet and the plug to 400°F for 7 minutes.
(7.9) Press at 400°F for 7 minutes at 116 psi.
(7.10) Cool to 50°F for 7 minutes at 116 psi.

(8.0) Fluid passages 101, 102, etc., are cut as grooves into gaskets 143, 144, 153, 154, etc.

(9.0) Stacks of cells are made up and in so doing the mating surfaces are coated with a sealant/adhesive (with coatings applied on grooved gasket faces above and below the groove--e.g. above and below groove 101/102 in FIG. 3) to prevent liquid leakage. The grooved gasket faces butt against the membranes 145, 155. Pressure plates (91, 92, 93) are applied at the ends of the stack and tied together with long bolts 99 to compressively grip the cell stack together in a manner well known in the art.

FIG. 1A is a fluid circuit diagram for any of the four major fluid flow systems--anolyte in, anolyte out, catholyte in, catholyte. As applied to a one electrolyte fuel cell stack or other electrolytic device, it would be electrolyte in or electrolyte out. Viewing it as applied to anolyte in, A1 is a source of anolyte (e.g. a pump supplying anolyte from a reservoir) to a series of fuel cells having voltage levels in the stack, due to series interconnection, of AV, BV, CV, DV, EV where AV>BV>CV>DV>EV. The total number of such cells is N1. The total stack is broken down into separate component stacks which are in the sub-block form of FIG. 1, sub-blocks SB1 and SB2 being indicated.

Nodes are indicated at X, Y, Z. There are 4 nodes Z, 2 nodes Y and one node X indicating a level of subdivision of N2=4, N3=2 in this particular example. The flow paths L1, L2, L3 analyzed above would run between nodes and cells as follows L3=X to Y
L2=Y to Z
L1=Z to cell Going to FIG. 1B now, the block of FIG. 1 with its two sub-blocks SB1 and SB2 is illustrated in an exploded diagrammatic view. The flow paths of anolyte in, anolyte out, catholyte in, catholyte out circuits for SB1 are illustrated. Sub-block SB2 has a flow system which is just a mirror image of that of SB1 in this embodiment (of FIGS. 1, 1A, 1B, 2 to 5) and is not shown.

The anolyte and catholyte supplies (anolyte in and catholyte in) are indicated at A.I. and C.I., respectively and the (spent) anolyte and catholyte drains at A.O. and C.I. respectively (anolyte out, catholyte out).

Sub-blocks 1 and 2 are indicated as monolithic sub-blocks without showing the component unit cells of their respective stacks.

Longitudinal channels P1–P8 were described, per se, in connection with FIGS. 2–5 above. The channel portions of P3, P4, P5 and P6 in press plate 91 are blocked as indicated by arrows.

Therefore anolyte comes into the stack through longitudinal P7, and catholyte comes in through longitudinal channel P6 of plate 91. The anolyte and catholyte continue in these channels through SB1 to press plate 93 where the anolyte traverses transverse channel 37 to P3 and the catholyte traverses transverse channel 48 to P4.

The anolyte and catholyte travel back longitudinally through SB1 via channels P3 and P4 respectively where they are distributed to the unit cells via branch tributaries as described in connection with FIGS. 3 and 1 above. After passing through the unit cells, and generating electrical power there, the anolyte and catholyte emerge, via branched tributaries, to respective return paths P5 and P6, then traverse transverse channels 26 and 15, respectively, then respectively traverse longitudinal paths P1, P2, and then re-emerge from the cell stack on the outside of plate 91, as indicated by the lines A.0. and C.O.

Figure 6:
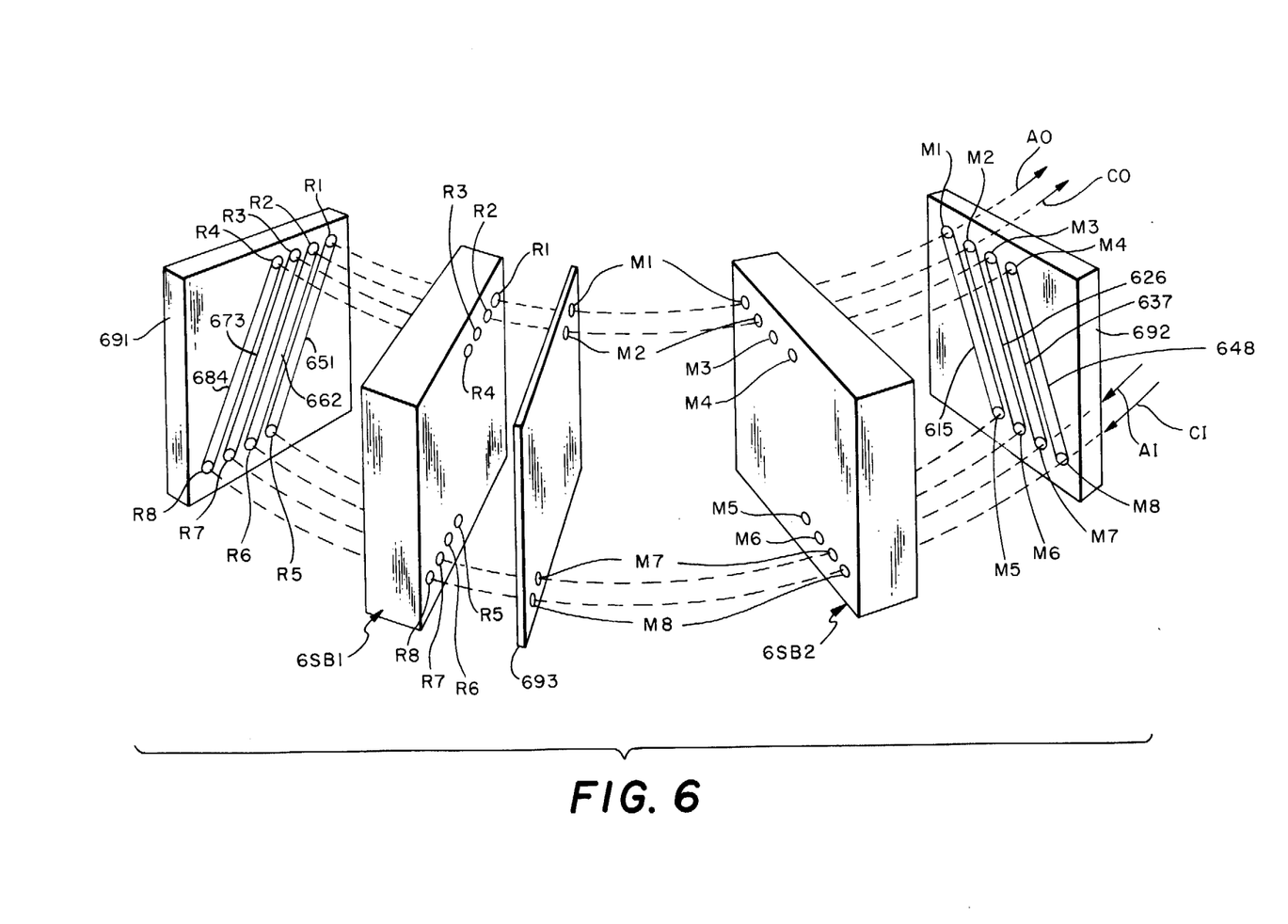
FIG. 6 is an exploded, diagrammatic view of a fuel cell block, in the same format as FIG. 1B, illustrating a second embodiment of the invention.

FIG. 6 is a diagrammatic exploded view, in form similar to FIG. 1B, illustrating a second embodiment in which the external connections for SB1 and SB2 are common lines AI, CI, AO, CO and a thin plate is provided between sub-blocks in lieu of the thick mid-plate of the FIG. 1, 1B embodiment.

The block fuel cell comprises outer pressing plates 691 and 692 both of which have transverse channels and longitudinal channels and mid-plate 693, typically a .020 inch molded plastic sheet, in contrast to the ⅜ inch thick sheets used for plates 691 and 692 (or 91, 92 and 93 in FIG. 1B). The component unit cells of each of sub-blocks 6SB1 and 6SB2 are compressed in the stack.

In 6SB1 the longitudinal channels are R1–R8 and in SB2 the longitudinal channels are M1–M8. Plate 693 has through-holes M1, M2, M7, M8 which are extensions of the correspondingly numbered channels of 6SB2 and connect, respectively, to R1, R2, R7, R8.

The plates 691 and 692 have transverse channels 684, 673, 662, 651 and 615, 626, 637, 648. These transverse channels are at least equal in length to the smaller average effective transverse height or width of the unit cells and constitute the effective design length of path L2 of the analytical model discussed above.

Anolyte and catholyte flows coming in at AI, CI are each subdivided, portions of the anolyte flow going through channel 637 and M7 and portions of catholyte flow going through channels 648 and M8. The flow through 637 and 648 continues into M3 and M4 which supply anolyte and catholyte to each supply anolyte and catholyte to each of the unit cells in 6SB2 (through branched tributaries as shown in FIG. 3). The flow through M7 and M8 by-passes 6SB2, continues into R7 and R8, up through 673 and 684 and then longitudinally back through R3 and R4 to supply anolyte and catholyte, respectively, to the unit cells of 6SB1 (through branched tributaries as shown in FIG. 3).

Spent anolyte and catholyte coming from the unit cells of 6SB1 (via branched tributaries) travels through longitudinal channels R5 and R6, up transverse channels 651 and 662 and longitudinally back and out via channels R1 and R2 and M1 and M2. Spent anolyte and catholyte from the cells of 6SB1 enter channels M5 and M6 (via branched tributaries) go up transverse channels 615 and 626 to join the emerging spent anolyte and catholyte flow paths of M1 and M2 respectively.

Figure 5:
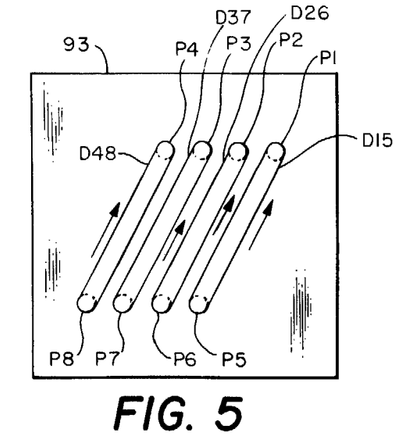

For purposes of the FIG. 6 embodiment, the plate 691 can be made similarly to plate 692 and then have its ports R1–R8 blocked or it can be made in the same fashion as plate 93 of FIG. 1, 1B, 5 with transverse channels cut on only one of its faces. In all embodiments, blocked ports of plates, if any, can be used to insert, control or measuring instrument heads into the sub-block.

Another variation of the invention to be considered is the use of cross-flow parallel feed and drain arrangement of the fluid circuit of each cell. In the FIG. 1B (and 1–5) embodiment, the cell of SB1 nearest plate 93 (cell 150 in FIG. 1) is first in parallel sequence for feed of anolyte via P3 and for drain of anolyte via P5 while the cell nearest plate 91 (cell 140 in FIG. 1) is last in both such sequences meaning that the flow path is harder to the last cell than the first cell (taking account now of the length of longitudinal passages P3, P5 and assuming uniform cross-section area throughout). This discrepancy can be balanced out, and in particular cases it will be useful to do so. For instance the anolyte drain in FIG. 1 could be via a transverse passage, connecting P1 and P5, cut into plate 91 rather than in 93, as shown in FIGS. 1 and 1B; then cell 150 would be first in feed sequence (shortest length of P3) and last in drain sequence (longest length P5) and cell 140 would be last in feed sequence and first in drain sequence.

It is evident that those skilled in the art, once given the benefit of the foregoing disclosure, may now make numerous additional uses and modifications of and departures from the specific embodiments herein described, without departing from the concept of the invention. Accordingly, the invention is to be construed as embracing each and every novel feature and novel combination of features present in and/or possessed by the apparatus and techniques herein disclosed and limited solely by the scope and spirit of the appended claims.

What is claimed is:

1. In a parallel electrolyte feed, parallel electrolyte drain stacked array of fuel cells with a common electrolyte supply and common electrolyte drain electrically connected in series, the improvement comprising, means defining a plate at an end of the stack with transverse conduits therein, means forming a first imperforate electrolyte feed conduit running along a marginal edge of said stacked cells essentially parallel to the direction of stacking and interconnecting said common electrolyte supply with an end of a first one of said transverse passages to define therewith an elongated electrolyte feed passage bypassing the cells in said stack, means defining a branched electrolyte feed channel running along a marginal edge of said stacked cells and having a feed end connected to an end of said first transverse conduit to define a branched passage receiving electrolyte from said first transverse conduit and supplying said electrolyte to said cells in parallel, means forming a second imperforate electrolyte drain conduit running along a marginal edge of said stacked cells essentially parallel to the direction of stacking and interconnecting said common electrolyte drain with a second one of said transverse passages to define therewith an elongated electrolyte drain passage bypassing the cells in said stack, means defining a branched electrolyte drain channel running along a marginal edge of said stacked cells and having a drain end connected to an end of said second transverse conduit and draining electrolyte from said cells in parallel.

2. Apparatus in accordance with claim 1 wherein the unit cells comprise two-electrolyte cells subdivided into anolyte and catholyte compartments and the apparatus comprises one of said complete inlet-to-parallel flowthrough-to-outlet fluid circuits for the respective anolyte compartments and catholyte compartments of the cell stack, and the longitudinal passages communicate with the said unit cells in fluid parallel.

3. Apparatus in accordance with claim 1 wherein said longitudinal passage branches into repeating sets of plural tributaries which reach therefrom to tangential contact with each cell at two spaced points to afford an elongated flow path of high resistivity and to facilitate uniformity of transverse flow through the cell.

4. Apparatus in accordance with claim 3 wherein each cell has means forming an integral manifold therein along a tangential edge thereof and running between said two spaced points to further facilitate uniformity of transverse flow through the cell.

5. Apparatus in accordance with claim 1 wherein said transverse channel containing plate constitutes an end pressing plate for the cell stack.

6. Apparatus in accordance with claim 5 wherein two sub-block cell stacks straddle a common, longitudinally central, transverse channel containing plate to form a single block.

7. The apparatus of claim 1 as a liquid—liquid electolyte fuel cell stack wherein each of said unit cells is a fuel cell of slab-like form and is subdivided by an ion-permeable membrane into two slab-like adjacent electrolyte compartments for anolyte and catholyte, the cells being in a stacked array in electrical series and aligned to produce an aggregate potential and power, available at anode and cathode electrodes at the ends of the stacked array, the said stacked array of two compartment unit cells comprising a repeating array of bi-polar electrode, gasket, membrane, gasket, bi-polar electrode, gasket, membrane, gasket, bi-polar electrode, all of sheet form with marginal and central portions aligned lontidudinally in the array in the direction of stacking, the central portions of the gaskets being empty to thereby form said slab-like aIternating anolyte and catholyte compartments, means forming a frame for the array a whole, elongated anolyte and catholyte feed and return passages passing through said frame with each of said passages having a first length portion which is unbranched and extends for a length at least equal to the length of the array and a second length portion extending from the first length portion which has branch tributaries extending into the multiple compartments served by said passage in fluid parallel, anode and cathode electrodes at the ends of the stacked array.

8. The apparatus of claim 7 wherein the said marginal portions of stacked sheet form members comprise the said frame and wherein the said passages are made up of aligned holes in said marginal portions, the said first and second length portions of each passage being parallel runs of such passage through the said marginal portions running end-to-end of the array, and further comprising, means forming an external fluid connection for each said passage at one end of the array and a transverse cross-over connection between the said first and second length portions of each such passage at the other end of the array.

9. The apparatus of claim 8 wherein the said block is divided into sub-blocks, and further comprises at least two of the said arrays longitudinally aligned and separated by a sheet form divider of electrically insulating material which is constructed and arranged to provide said transverse cross-over portions for the feed and return passages of both the said arrays.

10. The apparatus of claim 8 wherein the hollow center gaskets provide opposed side walls of the electrolyte compartment formed therein, and wherein the said tributaries of each passage are further branched into two sub-tributary passages, extending transverseley through the gaskets to two corners of one of the said opposing walls from a central branching point between said corners in the fluid flow circuit to provide liquid spreading and uniform liquid flow over the slab-like compartment served thereby.

11. The apparatus of claim 10 further comprising recesses in the electrolyte compartment forming end wall structures adjacent the said opposing side walls.

12. The apparatus of claim 11 wherein said recesses are formed by a construction of the bipolar electrodes with thin marginal portions and relatively thick central portions thereof to form shoulders on both faces thereof which are transversely spaced from the said gaskets and wherein the said tributary and sub-tributary branches are formed by recesses in the gaskets at the faces thereof which butt said membrane.

13. The apparatus of claim 8 further comprising a multiplicity of such blocks in combination with external distribution lines and means for placing the respective outlets of like passages of the respective blocks in fluid communication with a common one of said external distribution lines to provide a next higher level of parallel branching.

14. Fuel cell apparatus in accordance with claim 1
at least two additional higher stages of parallel branching for said fluid passage means
each stage of parallel branching being to cells of adjacent voltage levels.

15. Fuel cell apparatus in accordance with claim 1
means forming a spreading manifold within the compartment along said edge between said spaced points.

16. Fuel cell apparatus in accordance with claim 1
a laminate of carbon plastic composites comprising varying loadings of carbon from layer to layer in the laminate.

17. Fuel cell apparatus in accordance with claim 1
means for feeding fluid to and withdrawing fluid from the cells in cross flow parallel arrangement with first fed cells being last drained and last fed cells being first drained, respectively,
means forming transverse channels in the stack.

* * * * *